H. D. McKINNEY.

Toe-Weight and Quarter-Boot Attachment for Horses.

No. 9,163. Reissued April 20, 1880.

Witnesses:
William W. Dodge.
Sidney P. Nollingsworth

Inventor:
H. D. McKinney
By Dodge & Son
Attys.

N. PETERS, PHOTO-LITHOGRAPHER, WASHINGTON, D. C.

UNITED STATES PATENT OFFICE.

HENRY D. McKINNEY, OF JANESVILLE, WISCONSIN.

TOE-WEIGHT AND QUARTER-BOOT ATTACHMENT FOR HORSES.

SPECIFICATION forming part of Reissued Letters Patent No. 9,163, dated April 20, 1880.

Original No. 165.014, dated June 29, 1875. Application for reissue filed December 19, 1879.

*To all whom it may concern:*

Be it known that I, HENRY D. McKINNEY, of Janesville, in the county of Rock and State of Wisconsin, have invented certain new and useful Improvements in Toe-Weights and Quarter-Boots for Horses; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to toe-weights used upon the fore feet of horses to control the action of the feet, and also to quarter-boots designed to protect the rear side of the fore feet in the event of overreaching by the hind feet.

The primary and principal object of the invention is to secure the weight in place in such manner that it will not change its position or work loose under the violent shocks to which it is subjected when in use; and to this end it consists in establishing a firm connection between the weight and the shoe, in order that the former may be carried and retained in place by the latter, and in a peculiar construction of the parts in this regard.

The second part of the invention consists in applying a strap in such manner that it serves both to hold the quarter-boot and to assist in retaining the toe-weight in place.

Figure 1:
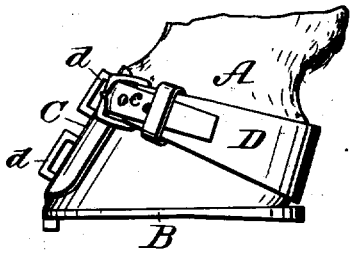
Figure 3:
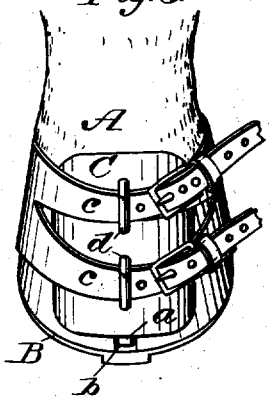
Figure 2:
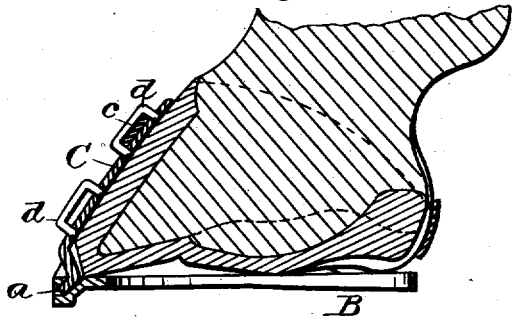
Figure 4:
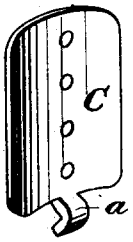
Figure 5:
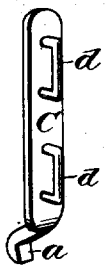
Figure 6:
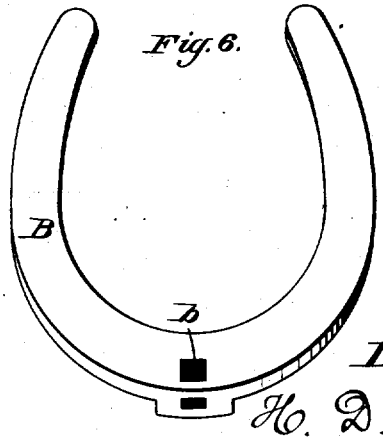

Figure 1 is a side elevation of a horse's foot and shoe, showing the toe-weight and the quarter-boot and strap connected therewith; Fig. 2, a vertical central section of the same; Fig. 3, a face view of the same with a double instead of a single strap; Fig. 4, a perspective view of the weight detached, looking against the inner side; Fig. 5, a perspective view of a device to be used in place of the weight to hold the boot-strap; Fig. 6, a perspective view of the shoe.

A represents the foot of the animal; B, the shoe; C, the toe-weight, and D the quarter-boot.

The weight is made of metal, of such weight and size as experience may dictate, and according to the difficulty to be overcome or the object to be attained, and is shaped to fit upon the outside of the hoof. At its lower end the weight is provided with a neck or spur, *a*, designed to enter the shoe, which latter is provided with a corresponding hole or recess, *b*, to receive the neck.

As shown in the drawings, the neck and hole are made of such form that the neck will engage in the shoe firmly and securely, and thus hold the weight down rigidly to the shoe and the foot, so that it cannot move either vertically or laterally in relation to them.

As an additional means of retaining the weight in place, I make use of a strap, *c*, which is attached to a quarter-boot, D, and extended thence around the foot through an eye, *d*, thereon.

The strap may be single, as shown in Fig. 1, or double, as in Fig. 3, in which latter case the weight will have two eyes, *d*, as represented.

It will be seen that the strap serves the two-fold purpose of retaining the boot and assisting to hold the weight.

It will also be seen that the weight can be readily detached and attached at will.

I am aware that toe-weights have been used in horse-boots and otherwise; but I believe myself to be the first to establish a rigid connection between the shoe and the weight, so that the latter is carried and held down in place by the shoe, and this construction I claim, broadly, the peculiar form and arrangement of the parts being of secondary importance.

When the weight is not used a light strip, such as shown in Fig. 5, adapted to engage with the shoe in the same manner as the weight, and provided with loops, may be used to hold the boot-strap in position on the hoof.

I am aware that quarter-boots and toe-weights have been provided at the front end with a hook or spur extending backward horizontally between the hoof and the shoe into a depression or channel in the hoof, and I am also aware that it has been proposed to form said recess or channel partly in the hoof and partly in the upper face of the shoe.

The recess or channel above referred to was designed merely to give room for the spur of the boot or weight between the shoe and hoof. The pressure of the hoof was depended on to keep the spur down in place, and the locking of the spur and the shoe to each other was not contemplated or provided for.

My construction differs from the above in that my weight is connected directly and firmly to the shoe, and held down in place by the latter instead of by the hoof; and my invention is confined to a construction wherein there is a strong connection between the weight and the shoe, so that the latter will hold the former in place.

I am aware that detachable calks have been applied to the under side of horseshoes, forming a necessary part thereof, and this I do not claim.

My invention relates exclusively to a supplemental weight applied to the top of the shoe.

Having thus described my invention, what I claim is—

1. In combination with a horseshoe, a toe-weight attached at the top of the shoe in front directly and firmly and held thereby, substantially as described and shown.

2. In combination with a horseshoe having a hole or cavity in its front, a toe-weight provided with a neck or projection adapted to enter said opening and interlock firmly with the shoe to hold the weight.

3. The combination of a horseshoe and a detachable toe-weight adapted and arranged, as shown, to engage directly and firmly therewith and to be held thereby.

4. The combination of the recessed shoe and the weight having the curved or shouldered neck, adapted to be seated and locked fast within the recess.

5. A toe-weight having a neck or stem adapted to be inserted into a vertical recess of a shoe, and to hold the weight in place above the shoe.

6. The combination of the recessed shoe, the weight having at its lower end a neck adapted to be locked firmly in the recess, and the strap encircling the hoof and weight.

7. The combination of the shoe, the weight adapted to be fastened directly thereto at the front, the boot, and the strap adapted to be applied to both the boot and the weight.

8. The weight C, provided with loops *d d* and spur *a*, in combination with the shoe having socket *b* and the fastening-strap.

HENRY D. McKINNEY.

Witnesses:
M. M. PHELPS,
S. H. HUDSON.